No. 850,316. PATENTED APR. 16, 1907.
G. REINHARDT.
FISH TANK ON TRANSPORTING CARS OR THE LIKE.
APPLICATION FILED NOV. 8, 1904.
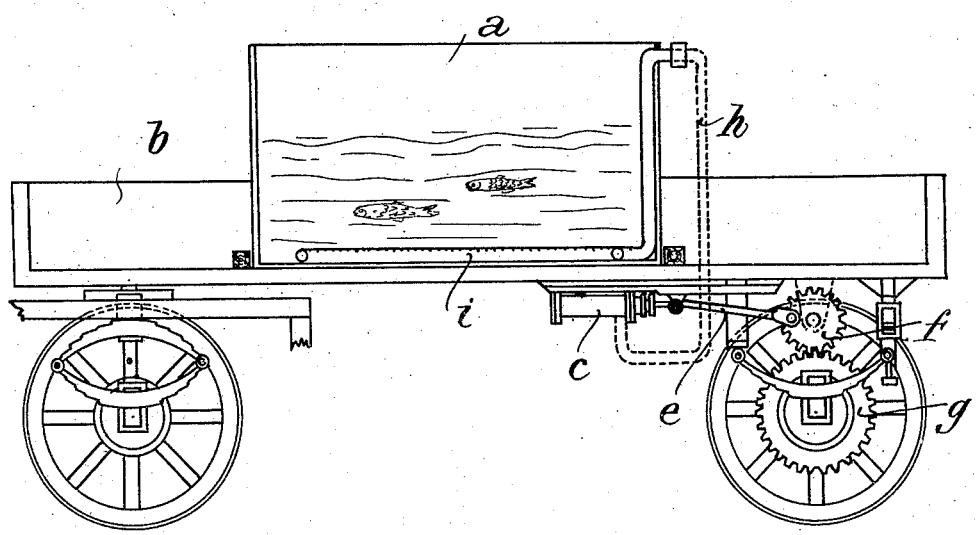
Witnesses:
Inventor:

UNITED STATES PATENT OFFICE.

GOTTHOLD REINHARDT, OF DRESDEN, GERMANY.

FISH-TANK ON TRANSPORTING-CAR OR THE LIKE.

No. 850,316.

Specification of Letters Patent.

Patented April 16, 1907.

Application filed November 8, 1904. Serial No. 231,964.

*To all whom it may concern:*

Be it known that I, GOTTHOLD REINHARDT, a subject of the German Emperor, and a resident of Dresden-A., Germany, have invented certain new and useful Improvements in Fish-Tanks on Transporting-Cars or the Like, of which the following is a specification.

In order that when transporting living fish the oxygen required by the same for breathing may be constantly renewed in the water by a continuous supply of fresh air, the present invention proposes to provide the transporting-cars for fish-reservoirs with an air-pump which is actuated by the axle of a wheel and presses air through the water of the fish-reservoirs.

On the accompanying drawing is represented a car with a fish-reservoir and with the said device in a longitudinal section.

The fish-reservoir $a$ is carried by the two-axle car $b$. At the bottom of the car is fastened the air-pump $c$. The piston of the air-pump is moved by a slide-rod $e$ and toothed gear $f g$, actuated by a wheel-axle. The air is conveyed from the air-pump through a conduit $h$ into the reservoir $a$ below the surface of the water and preferably through a distributer $i$, arranged at the bottom of the reservoir in order to bring about a thorough distribution of the air in the water.

The device can of course also be used on a car with one axle. It is immaterial whether the air-pump is arranged in or under the car and in what way it is actuated by the axle of the car.

What I claim as my invention, and desire to secure by United States Letters Patent, is—

In an apparatus for transporting live fish the combination of a truck, wheels, axles connecting said wheels, cog-wheel mechanism attached to one of said axles, an air-pump fixed on the truck, said air-pump being actuated by the cog-wheel mechanism, a tank containing water, a pipe conveying the pumped air into the lower part of the tank, and a distributer at the end of said pipe inside the tank, said distributer being provided with a number of apertures, and adapted to distribute the air evenly through the whole mass of water, all substantially as and for the purpose set forth.

In testimony whereof I have signed my name to this specification in the presence of two subscribing witnesses.

GOTTHOLD REINHARDT.

Witnesses:
 PAUL E. SCHILLING,
 PAUL ARRAS.